US006810271B1

(12) United States Patent
Wood et al.

(10) Patent No.: US 6,810,271 B1
(45) Date of Patent: Oct. 26, 2004

(54) KEYPADS FOR ELECTRICAL DEVICES

(75) Inventors: Todd Wood, Los Angeles, CA (US);
Kari Mustonen, Jyväskylää (FI)

(73) Assignee: Nokia Mobile Phones Ltd., Espoo (FI)

( * ) Notice: Subject to any disclaimer, the term of this patent is extended or adjusted under 35 U.S.C. 154(b) by 380 days.

(21) Appl. No.: 09/703,060

(22) Filed: Oct. 31, 2000

(51) Int. Cl.[7] ................................................ H04Q 7/20
(52) U.S. Cl. ..................................... 455/566; 455/90.3
(58) Field of Search ................................. 455/566, 564, 455/550.1, 575.1, 90.1, 90.2, 90.3; 379/433.01, 433.07, 368; D14/148, 149, 150; 345/168, 169; 341/20, 22

(56) References Cited

U.S. PATENT DOCUMENTS

| 4,875,234 | A | | 10/1989 | Tragatschnig | |
| 5,701,123 | A | * | 12/1997 | Samulewicz | ................. 341/22 |
| 5,901,223 | A | | 5/1999 | Wicks et al. | |
| 6,067,358 | A | | 5/2000 | Grant | |
| D438,847 | S | * | 3/2001 | Hasegawa | ................. D14/412 |
| 6,297,806 | B1 | | 10/2001 | Skoog | |
| 6,298,230 | B1 | * | 10/2001 | Schneider-Hufschmidt | . 455/411 |
| 6,359,838 | B1 | * | 3/2002 | Taylor | ......................... 368/13 |

FOREIGN PATENT DOCUMENTS

| EP | 0 272 715 | 6/1988 |
| EP | 0 998 102 | 10/1999 |

* cited by examiner

Primary Examiner—Erika Gary
(74) Attorney, Agent, or Firm—Jubin Dana; Steven A. Shaw

(57) ABSTRACT

A mobile telephone including a body, a display, and a keypad. The keypad has a plurality of individual numeral keys assigned to individual numerals that are disposed about a navigation key for navigating about the display or a selected central key.

12 Claims, 4 Drawing Sheets

KEYPADS FOR ELECTRICAL DEVICES

BACKGROUND

This invention relates to mobile communication systems and, more specifically, to keypads for mobile communication devices.

In order for mobile telephones to be conveniently usable, they are of a relatively small size. Accordingly, the keypads of such devices are also small. This is particularly the case since, not only are smaller mobile telephones being manufactured, but it is becoming desirable to have larger displays on such devices, which means that there is less space available on which to provide a keypad. For such small keypads, an important factor is the ease with which they may be used by a user. A keypad should enable a user to select keys rapidly, in a way that is natural, intuitive, and without involving unnecessary finger movement.

Keypads for mobile telephones generally have a common, basic, configuration shown in FIG. 1. Keys that are used in dialing numbers (and for other purposes) are typically provided in a 4 by 3 matrix having a first row of numerals "1", "2" and "3", a second row of numerals "4", "5" and "6", a third row of numerals "7", "8" and "9" and a fourth row having a first character/function key, numeral "0" and a character/function function key. Another arrangement of keys, which is usually located above this arrangement, is used to carry out other functions such as initiating and terminating telephone calls and navigating around the screen and various menus of a user interface of the mobile telephone.

One disadvantage of this arrangement is that there is little natural spatial correspondence between the locations of the keys and the selectable numerals. For example, although key "6" is adjacent to one key "5" (as a row neighbor), it is also below key "3" and above key "9" (as two column-neighbors). Therefore, use of such a keypad needs to be learned by a user. For example, it is not unusual for a user to remember the input sequence of a telephone number or a code by remembering the pattern of finger movements used in inputting the telephone number or code.

In order to provide a more readily useable keypad for a mobile telephone, alternative arrangements have been proposed. WO 98/24103 and WO 99/48120 disclose keypad arrangements in which numeral keys are disposed in a generally oval configuration.

Therefore, a keypad is needed that includes a plurality of keys disposed about a central navigational key.

SUMMARY

Accordingly, a keypad is provided that includes a plurality of individual numeral keys assigned to individual numerals and a navigation key for navigating about a display wherein the numeral keys assigned to individual numerals are disposed about the navigation key or some centrally located key.

An advantage of the present invention is that a user can keep his or her thumb (or some other digit) poised on the navigation key and, every time a numeral key is to be pressed, the distance that the user moves his thumb is substantially the same. This provides an easier movement for a user's thumb as it travels over the keypad.

In one embodiment, the device includes a display and a keypad. The keypad, wherein the numeral keys assigned to individual numerals are disposed about the navigation key.

In another embodiment, the numeral keys are disposed around an acknowledgement key or an alternative central key (such as a numeral key) rather than a navigation key.

Although reference is made to key-presses and pressing of keys herein, it is to be understood that an electrical device according to the invention may receive input by pressing of keys or by some other means.

DETAILED DESCRIPTION

Figure 1:
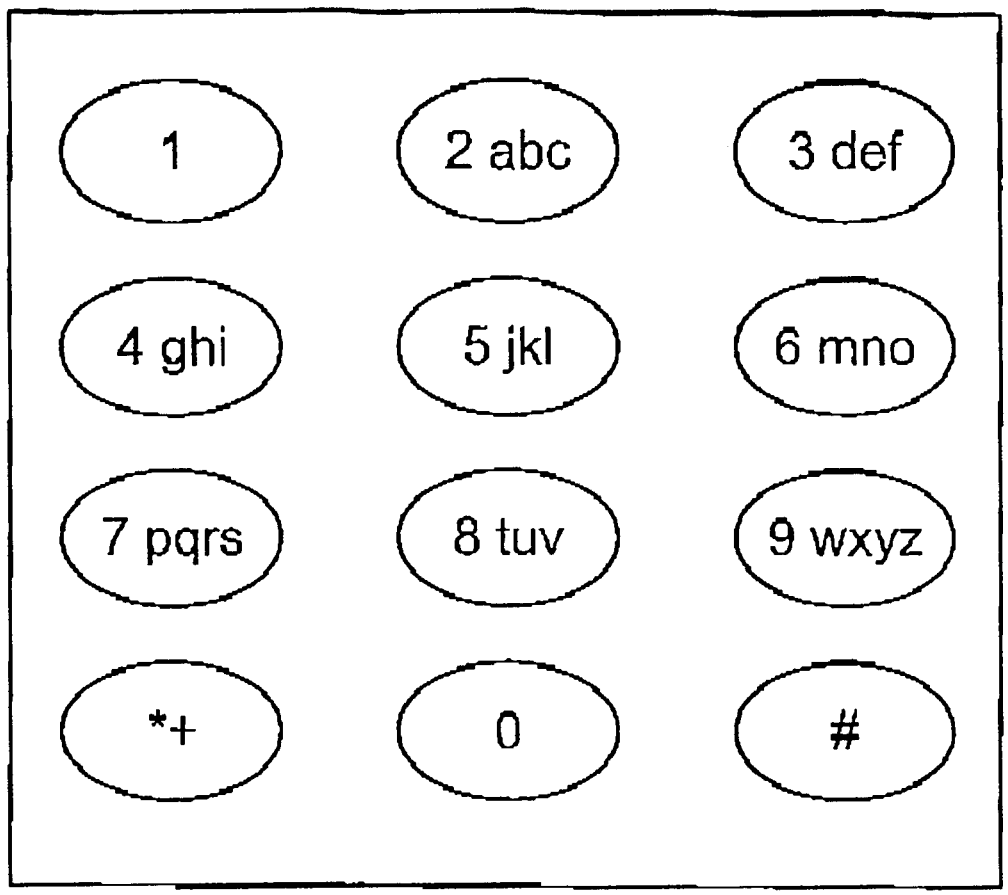
FIG. 1 shows a prior art keypad.
Figure 2:
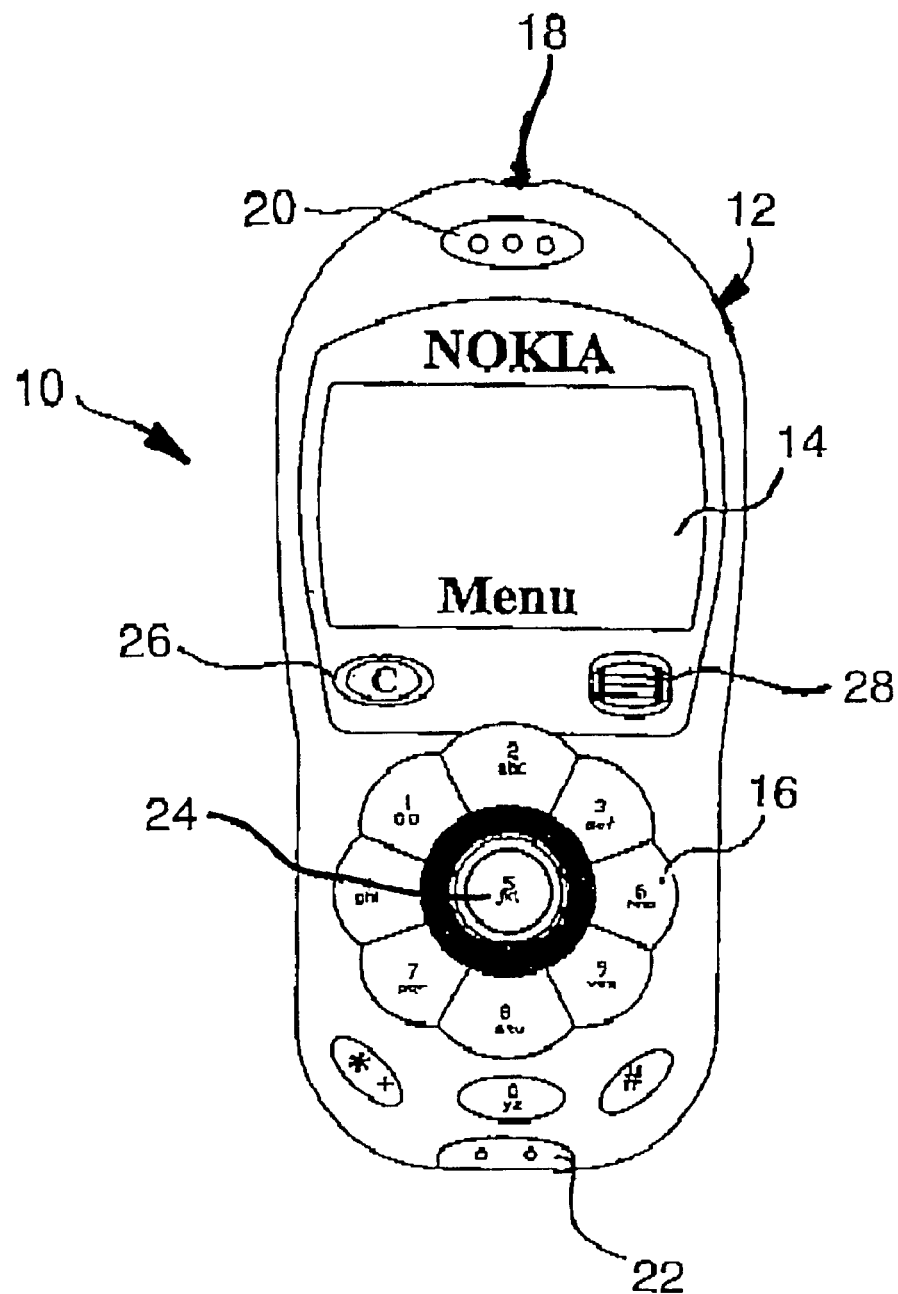
FIG. 2 shows a mobile terminal according to a first embodiment of the invention.

Referring now to FIG. 2, a mobile terminal 10 includes a body 12, a display 14, a keypad 16, an on/off button 18, an earphone 20 and a microphone 22. The display 14 is elongate and has a non-unity aspect ratio.

The keypad 16 includes a keymat that includes a plurality of keys located above a pressure sensitive part. The pressure sensitive part has a plurality of pressure sensitive areas that detect key presses and produce corresponding electrical signals. An individual key includes a part of the keymat and its corresponding pressure sensitive area on the pressure sensitive part.

Individual keys are dedicated to the operation of the mobile terminal 10 and include keys to initiate and terminate calls, so-called soft keys, a cancel key 26, and a browsing key 28, here shown in the form of a roller. The keypad 16 also includes a set of numerical keys disposed in a circular arrangement around a centrally located numerical key. As can be seen, the keys are arranged in a group of three uppermost keys "1", "2", and "3", a group of three lowermost keys "7", "8", and "9" and a group of middle keys "4", "5", and "6" located between the uppermost and lowermost groups. Numerical key "5" is the centrally located key.

Key "5" is located in the middle of a navigation key 24. The navigation key 24 comprises a rocking switch having an 8-way actuation and can be actuated by a user pressing down on a suitable part of the navigation key 24. The navigation key may be used, among other things, to control movement of a cursor in the display or to move a selection highlighter through menus in the display. The term "navigation key" refers to any suitable manually operable input receiving means and includes such things as joysticks, rollers and the like.

Below the lowermost group of keys are located numeral key "0", an asterisk key and a pound or hash key. The keys "0" to "4" and "6" to "9" are disposed in the form of an annulus surrounding the navigation key 24. The annulus is segmented into separate pieces each of which can be individually pressed without necessarily causing pressing of any other part of the annulus. The numeral keys "1" to "4" and "6" to "9" have been provided to have additional curvature at their outer edges to increase their touch area as well as to enhance key activation. The numeral keys are arranged in a ring arrangement around the navigation key or other central key. A separate piece of the ring arrangement may be assigned to each of the numeral keys. Separate pieces may be able to move relatively to each other, for example when there is a key-press for a particular key.

The keys are not only used for numerical input but they are also used to input alphabetical and other characters. For example, the key "2" typically has an alphabet of characters "2", "a", "b", and "c". Although other characters may be present, for example equivalents of these characters in other languages, only these four characters will be considered for the sake of simplicity. In normal telephone mode of the mobile terminal 10, pressing key "2" selects numeral "2". Alternatively, in writing short message service (SMS) messages, letter "a" is selected by a single key-press of this key, letter "b" is selected by a double key-press of this key, letter "c" is selected by a triple key-press of this key and so on. Other letters of the alphabet are present on other keys. The key "1" also has a set of punctuation marks assigned to it. The alphabetical characters and punctuation marks, as well as the numerical characters, can be used in the writing of text, for example, SMS messages.

Figure 3:
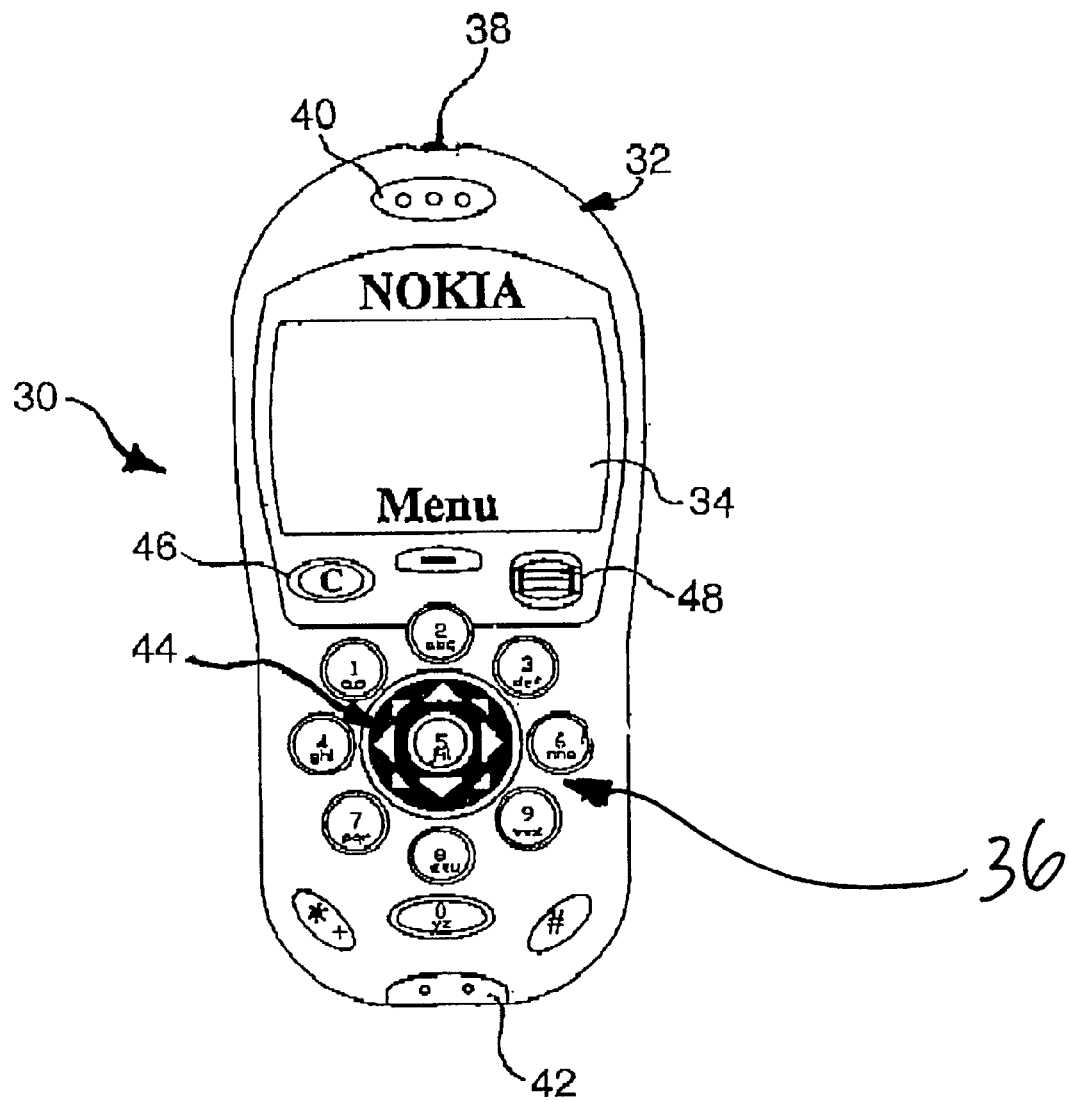
FIG. 3 shows a mobile terminal according to a second embodiment of the invention.

FIG. 3 shows a mobile terminal 30 according to the invention. Its arrangement and operation are similar to the mobile terminal 10 of FIG. 2. The mobile terminal 30 includes a body 32, a display 34, a keypad 36, an on/off button 38, an earphone 40, and a microphone 42. The display 34 is elongate having a non-unity aspect ratio.

The keypad 36 includes a keymat that includes a plurality of keys located above a pressure sensitive part. The pressure sensitive part has a plurality of pressure sensitive areas that detect key presses and produce corresponding electrical signals. An individual key includes a part of the keymat and its corresponding pressure sensitive area on the pressure sensitive part.

Individual keys are dedicated to the operation of the terminal and include keys to initiate and terminate calls, so-called soft keys, a cancel key 46, and a browsing key 48, here shown in the form of a roller. The keypad 36 also includes a set of numerical keys disposed in a circular arrangement around a centrally located numerical key. As can be seen, the keys are arranged in a group of three uppermost keys "1", "2", and "3", a group of three lowermost keys "7", "8", and "9" and a group of middle keys "4", "5", and "6" located between the uppermost and lowermost groups. Numeral key "5" is the centrally located key.

Key "5" is located in the middle of a navigation key 44. The navigation key 44 includes a rocking switch having an 8-way actuation and can be actuated by a user pressing down on a suitable part of the navigation key 44.

Below the lowermost group of keys are located numeral key "0", an asterisk key, and a pound or hash key.

In FIG. 3, the numeral keys are separated from one another rather than being adjacent and forming a segmented annulus as in FIG. 2.

Figure 4:
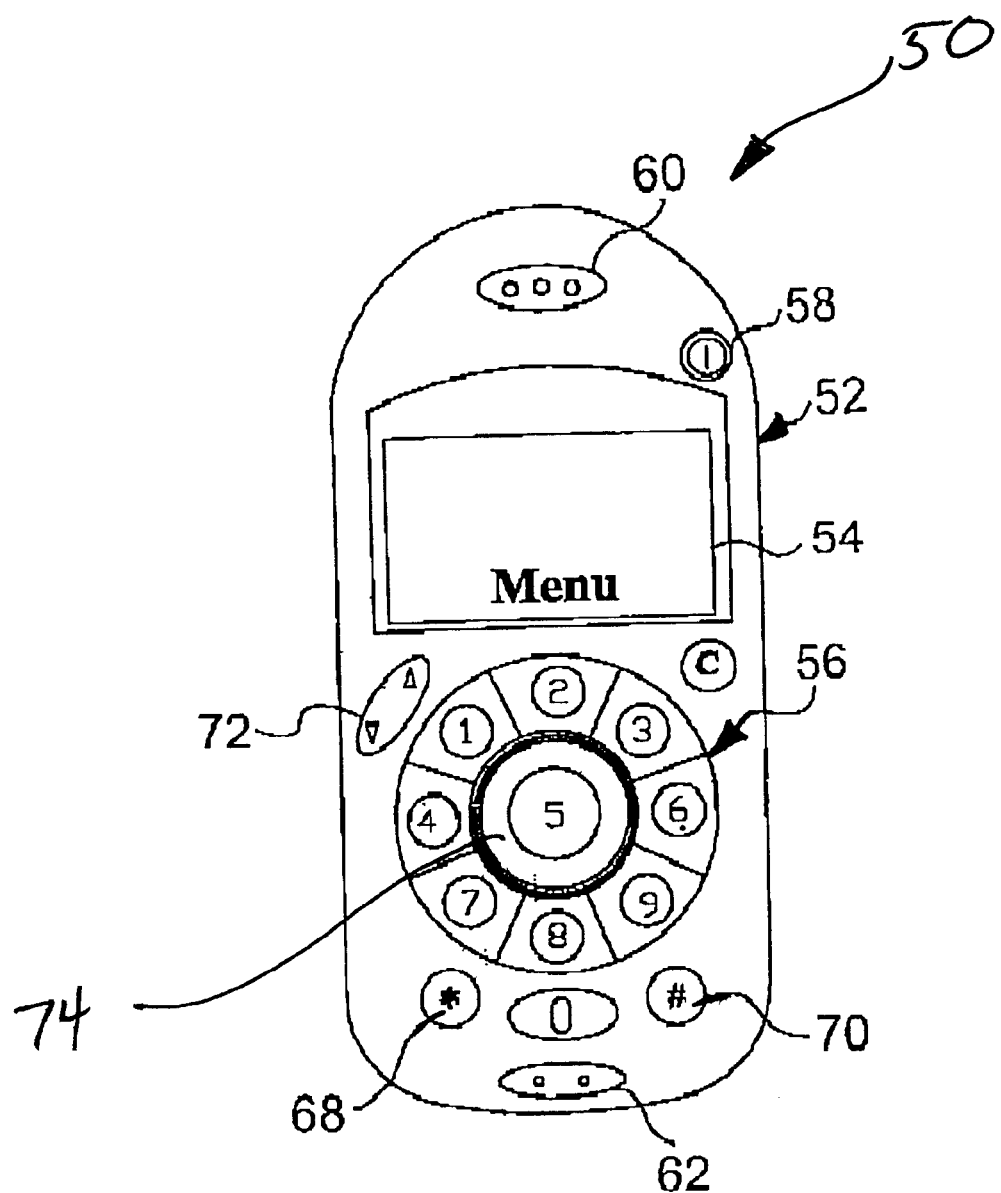
FIG. 4 shows a mobile terminal according to a third embodiment of the invention.

FIG. 4 shows a mobile terminal 50. Its arrangement and operation are similar to the mobile terminal 10 of FIG. 2. The mobile terminal 50 includes a body 52, a display 54, a keypad 56, an on/off button 58, an earphone 60, and a microphone 62. The display 54 has a non-unity aspect ratio. The keypad 56 includes a keymat that includes a plurality of keys located above a pressure sensitive part. The keymat and the pressure sensitive part interact as described above in relation to mobile terminals 10 and 30.

Individual keys are dedicated to the operation of the mobile terminal 50 and include keys to initiate and terminate calls (not shown), an asterisk key 68, and a pound or hash key 70. Rather than having a navigation key located within a set of numerical keys disposed in a circular arrangement, the navigation key is provided as key 72. A ring key 74 is centrally located and functions as key "5". However, it may be preferred, as in this embodiment, to have an additional function key associated with the ring key 74. This associated function key may be a receive key, which can receive calls to the mobile terminal 50.

In each of the embodiments, the distance between the numeral keys, with the exception of key 0, and the navigation key or ring acknowledgement key will substantially remain the same, irrespective of which numeral key is pressed. This speeds up operation of the keypad because the course traveled by a user's digits is shortened to a minimum.

One advantage of the invention is that the entire keypad may activate two separate 4-directional rocker lever structures, which makes 8 in total, that is 2×4. In this way, the keypad (or at least numeral keys "1" to "4" and "6" to "9") may be provided as a single piece. Therefore, it is relatively easy to activate all eight numeral keys by a digit, particularly a thumb grip. Due to the rocker lever structures, key activations may be more rapid and the amount of finger, or thumb, power required may be reduced.

Although the foregoing description relates to a mobile terminal such as a mobile telephone, it should be understood that the invention can be applied to other devices, such as computers, personal digital assistants, and entry terminals for inputting data or access codes, for example to gain access to a building or to another secure location.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. For example, referring to FIGS. 2, 3, and 4, the keys may include additional curvature at the outer edges and have an illuminating light for improved visibility in poor lighting conditions. Furthermore, all of the numeral keys may be disposed about the navigation key; alternatively, only some of the keys may be disposed about the navigation key, such that all but one of the keys may be disposed about the navigation key.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A mobile phone comprising:
   a body:
   an elongated display having a non-unity aspect ratio secured to the body whereon a browsable menu is displayed; and
   a keypad comprising a plurality of keys in a circular arrangement around an acknowledgement ring key so that the distance between the plurality of keys and the acknowledgement ring key is substantially the same irrespective of which one of the plurality of keys are activated, and wherein the acknowledgement ring key defines a center in which is disposed a single centrally located key.

2. A mobile phone according to claim 1, wherein the keypad is arranged to enable a 4 and 8-directional browsing of the browsable menu by rocking the acknowledgement ring key in the direction of one of the plurality of keys.

3. A mobile phone according to claim 1, wherein the keys are provided with additional curvature at the outer edges.

4. A mobile phone according to claim 1, wherein the acknowledgement ring key is provided with an illumination light.

5. A mobile phone according to claim 1, wherein the outer circle of the acknowledgement ring key has eight digit/letter keys.

6. A mobile phone of claim 1 wherein the acknowledgement key is a navigation key.

7. The mobile phone of claim 1, wherein the keypad comprises:
  a removable keymat defining the plurality of individual numeral keys; and
  a corresponding plurality of pressure sensitive areas that detect key presses and produce corresponding electrical signals.

8. A mobile phone comprising:
  a body:
  an elongated display having a non-unity aspect ratio secured to the body whereon a browsable menu is displayed; and
  a keypad comprising a plurality of keys in a circular arrangement around an acknowledgement ring key so that the distance between the plurality of keys and the acknowledgement ring key is substantially the same irrespective of which one of the plurality of keys are activated, and wherein the acknowledgement ring key-defines a center in which is disposed a single centrally located key and wherein the acknowledgement ring key is a receive key which can receive calls made to the mobile phone.

9. A mobile phone comprising:
  a body:
  an elongated display elongate laterally with respect to the body of the mobile phone having a non-unity aspect ratio secured to the body whereon a browsable menu is displayed; and
  a keypad comprising a plurality of keys in a circular arrangement around an acknowledgement ring key so that the distance between the plurality of keys and the acknowledgement ring key is substantially the same irrespective of which one of the plurality of keys are activated, and wherein the acknowledgement ring key defines a center in which is disposed a single centrally located key.

10. An mobile phone comprising:
  a body:
  a display secured to the body, wherein said display having a non-unity aspect ratio elongated In a longitudinal direction; and
  a keypad coupled to the body, wherein the keypad comprises:
    a plurality of individual numeral keys assigned to individual numerals; and
    a navigation key for navigating about the display, wherein the plurality of individual numeral keys disposed about the navigation key in a circular pattern.

11. The mobile phone of claim 10, wherein only some of the plurality of individual numeral keys are disposed about the navigation key.

12. The mobile phone of claim 10, wherein the keypad comprises:
  a keymat defining the plurality of individual numeral keys; and
  a corresponding plurality of pressure sensitive areas that detect key presses and produce corresponding electrical signals.

\* \* \* \* \*